United States Patent [19]

Lederman

[11] Patent Number: 4,924,980
[45] Date of Patent: May 15, 1990

[54] CONTROL CAR ROLLER CLUTCH WITH IMPROVED ASSEMBLY

[75] Inventor: Frederick E. Lederman, Sandusky, Ohio

[73] Assignee: General Motors Corporation, Detroit, Mich.

[21] Appl. No.: 402,303

[22] Filed: Sep. 5, 1989

[51] Int. Cl.⁵ ............................................. F16D 41/06
[52] U.S. Cl. ................................... 192/45; 192/41 R
[58] Field of Search ..................... 192/45, 44, 41 R; 188/82.84

[56] References Cited

U.S. PATENT DOCUMENTS 4,712,661 12/1987 Lederman et al. .................. 192/45
4,821,856 4/1989 Lederman ........................... 192/45

FOREIGN PATENT DOCUMENTS 1213177 3/1966 Fed. Rep. of Germany ... 188/82.84

Primary Examiner—Rodney H. Bonck
Assistant Examiner—Andrea Pitts
Attorney, Agent, or Firm—Patrick M. Griffin

[57] ABSTRACT

A roller control car clutch with improved assembly has control cars provided with special clearance notches so that the cars may be assembled into the pockets with no resistance, and along straight, orthogonal lines. The rollers prevent the cars from being later withdrawn.

3 Claims, 3 Drawing Sheets

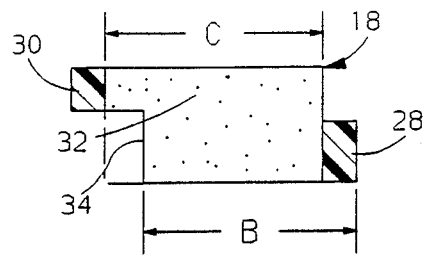
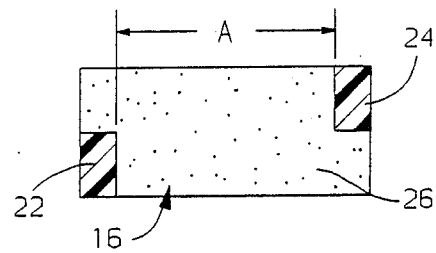
FIG.6  FIG.7
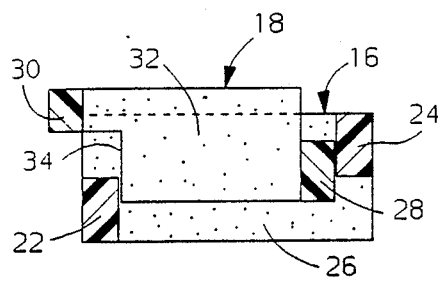
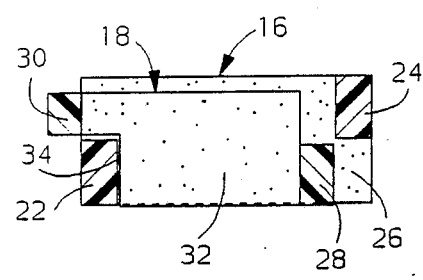
FIG.8  FIG.9
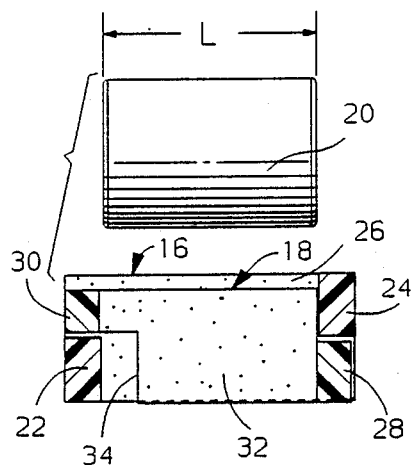
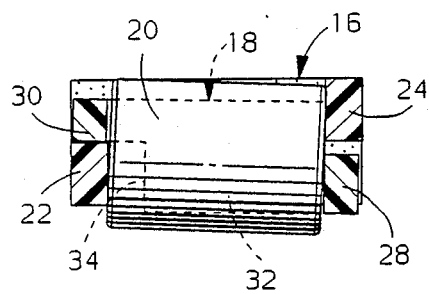
FIG.11
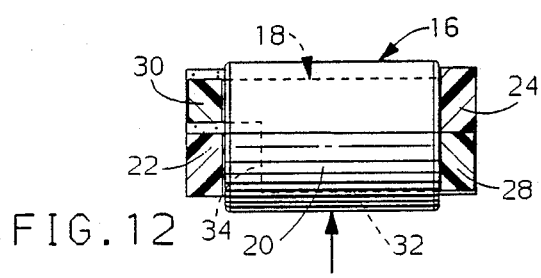
FIG.10  FIG.12

CONTROL CAR ROLLER CLUTCH WITH IMPROVED ASSEMBLY

This invention relates to roller clutches in general, and specifically to a new control car roller clutch design that lends itself to an improved assembly technique.

BACKGROUND OF THE INVENTION

A recent advance in roller clutch design by the assignee of the subject invention is the control car roller clutch, in which each roller is contained in a separate, close fitting car. The use of a control car provides a number of advantages, including more secure roller retention prior to installation, and reduced roller skew and spin during clutch operation. One version of the control car roller clutch uses both a molded plastic cage having a series of pockets, and a plurality of molded plastic cars, one for each pocket. Advantage is taken of the way in which such plastic parts are often molded to provide a compact design. Plastic parts with axially opposed, parallel members, such as the side rails of roller pockets, may be bypass molded, if the side rails have no radial overlap. This is sometimes referred to as an over/under configuration. If both the pockets and the control cars are so molded, then car side flanges on the cars may be overlapped with the pocket side rails to give an axially compact package. The axial overlap between pocket side rails and car side flanges presents a problem during assembly, however. When the car is fitted between the side rails, it has to be twisted into place. If the overlap is great enough, the side rails may have to be forced apart to get the car into place. Such an assembly motion is much more difficult to automate than would be a technique that needed only straight line, right angle motions, and which provided low resistance forces.

SUMMARY OF THE INVENTION

The invention provides a new control car roller clutch design that has molded plastic cars and pockets with a similar overlap, but in which the cars and pockets can be assembled together with straight line, right angle motions only, and with low forces.

Two preferred embodiments are disclosed. In the first, a plurality of bypass molded, rectangular plastic pockets are arrayed about a central axis. Each pocket has a lower side rail and a diagonally opposed upper side rail parallel to it, defining a predetermined axial width as measured between the inner surfaces of the side rails. A bypass molded plastic car is provided for each pocket. Each car is also generally rectangular, with a lower side flange and a diagonally opposed and parallel upper side flange. Each car may be oriented within a pocket with the car side flanges and pocket side rails in an axially overlapping relation. Additional structural features allow them to be so assembled much more efficiently.

Each car also has a pair of parallel crossbars connecting its side flanges. The axial width of the car crossbars is basically equal to the width of the pocket, but one side of each crossbar is relieved by a lower edge notch just large enough to clear the pocket lower side rail. Thus, each car may be placed in a pocket simply by moving it in a straight radial line down into the pocket, as the edge notch clears the pocket side rail without resistance. Then, the car is shifted at a right angle, axially to the side, to bring the pocket side rails and car side flanges into overlapping relation. The car could be just as easily withdrawn, of course. Retention of each car in its pocket is provided by a cylindrical steel roller, one for each car, which has a diameter that fits closely enough between the car crossbars to be retained in the car. The length of roller is just slightly less than the pocket width. As a consequence, once the roller is in the car, the car cannot shift axially back, and the overlap is maintained. The pockets, cars and rollers thus cooperatively retain themselves together, and the assembly motions and forces involved are such as to be easily automated. In a second embodiment, each car has two edge notches, so that it may be assembled in either radial direction.

It is, therefore, an object of the invention to provide a control car roller clutch of the type has axially overlapping pockets and cars in which the cars may be assembled into the pockets with straight line, right angle, low force motions.

It is another object of the invention to provide the cars with a clearance edge notch that allows the cars to be so assembled, after which a close fitting roller may be fitted into the car so that the clearance notch is prevented thereafter from allowing the car to be withdrawn from the pocket, and all components will be cooperatively retained together.

It is another object of the invention to provide a car that has two clearance notches, so that it may be assembled in either direction.

DESCRIPTION OF THE PREFERRED EMBODIMENT

These and other objects and features of the invention will appear from the following written description, and from the drawings, in which:

FIG. 6 is a view like FIG. 5, showing some dimensions of the control car;

FIG. 7 is a view like FIG. 4, aligned with FIG. 6 so as to directly compare dimensions;

FIG. 8 shows an initial step in the assembly of the control car into a pocket;

FIG. 9 shows the assembly process farther along;

FIG. 10 shows the car and pocket fully aligned, before the roller is added;

FIG. 11 shows the complete assembly, after the addition of the roller, as it is affected by gravity;

FIG. 12 shows the complete assembly as affected by a force acting radially outwardly;

Figure 1:
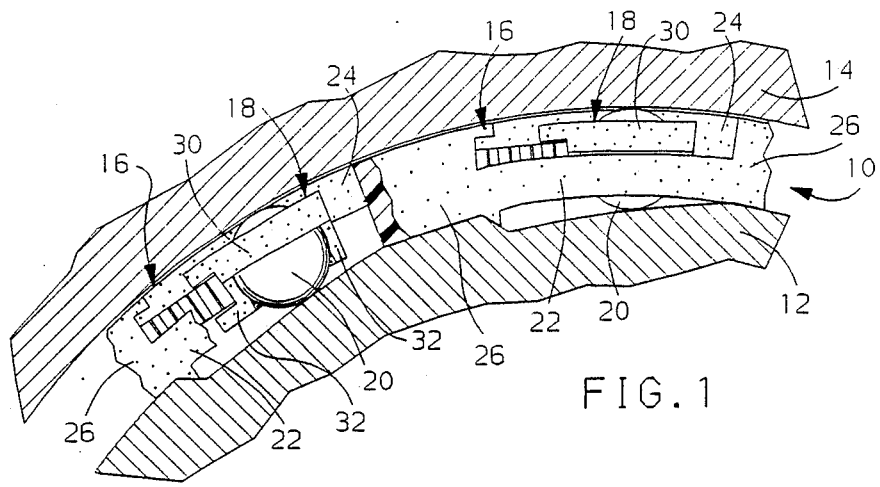
FIG. 1 is an end view of a roller clutch incorporating a first embodiment of the invention, with part of one pocket side rail broken away.

Referring first to FIG. 1, a first embodiment of the roller clutch of the invention, indicated generally at 10, is shown installed between a pair of clutch races 12 and 14. Clutch 10 includes a cage comprised of a plurality of molded plastic roller pockets, each indicated generally at 16, an equal plurality of molded plastic roller control cars, each indicated generally at 18, and a cylindrical steel roller 20 for each car 18. The pockets 16 are basically conventional, as are the rollers 20, but the cars 18 are specifically designed to cooperate uniquely with the pockets 16 and rollers 20.

Figure 2:
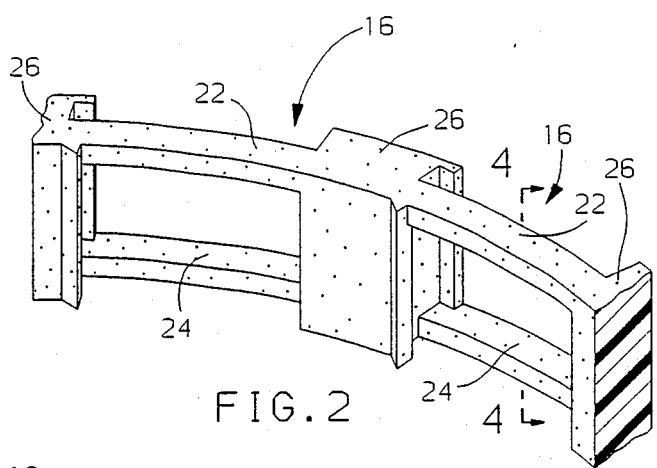
FIG. 2 is a perspective view of two pockets.
Figure 3:
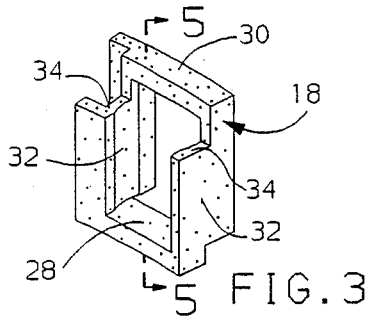
FIG. 3 is a perspective view of a control car.
Figure 4:
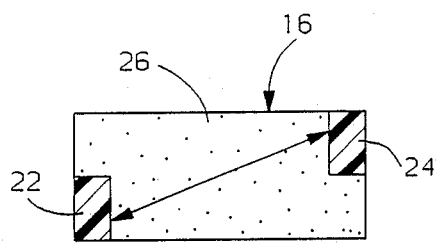
FIG. 4 is a sectional view of a pocket taken in a plane indicated by the line 4—4 in FIG. 2.

Referring next to FIGS. 2, 4 and 7, the pockets 16 are arrayed circumferentially about a central axis, in a generally annular pattern. Each individual pocket 16 is basically a rectangular box, consisting of a lower side rail 22 and an upper side rail 24 joined by journal blocks 26. The pocket side rails 22 and 24 have a slight curvature when viewed down the axis, but their inner surfaces are flat and parallel. The axial separation of the inner surfaces of the pocket side rails 22 and 24 may be thought of as defining a pocket width A, see FIG. 7. As best shown by the arrow in FIG. 4, the lower and upper pocket side rails are diagonally opposed, that is, they lie on different radii, in addition to being axially opposed. In fact, since the pockets 16 are bypass molded, the side rails 22 and 24 have no radial overlap at all. This represents the basic over/under configuration referred to above. It would not be absolutely necessary to the practice of the subject invention that the side rails 22 and 24 have no radial overlap, so long as they had at least a pair of axially disposed surfaces that were diagonally opposed, that is, axially separated and lying on different radii. This would in fact hold true for parallel side rails that had exactly the same radius, since the radially inner surface of one and the radially outer surface of the other would still be at differing radii. As a practical matter, given the cost benefit of bypass molding, it is a great advantage if the pocket side rails themselves are diagonally opposed, that is, with no radial overlap.

Figure 5:
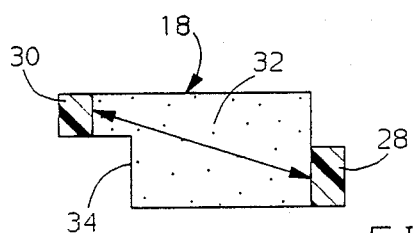
FIG. 5 is a sectional view of the control car taken in a plane indicated by the line 5—5 in FIG. 3.
Figure 13:
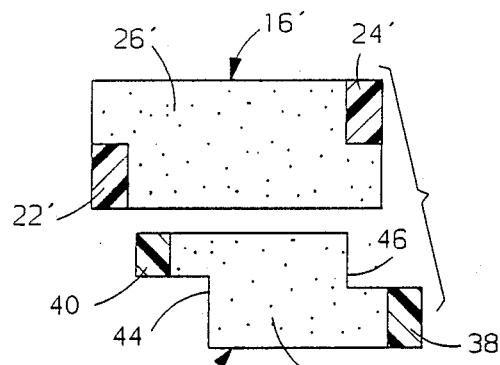
FIG. 13 shows a pocket and car according to a second embodiment of the invention.
Figure 14:
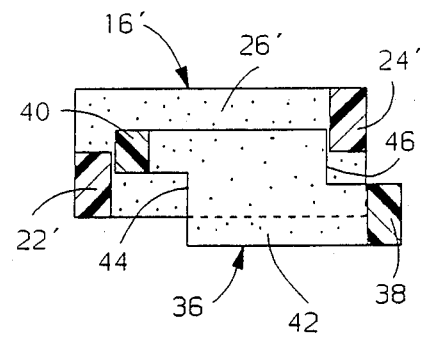
FIG. 14 shows the second embodiment in the process of being assembled.
Figure 15:
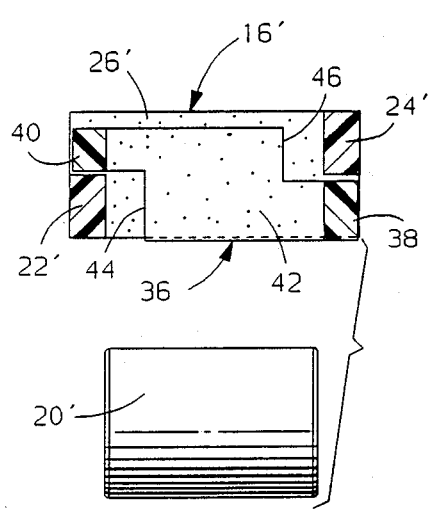
FIG. 15 shows the second embodiment fully aligned, before the roller is added.

Referring next to FIGS. 2, 5, 6 and 10, details of the construction of control car 18 may be seen. Car 18 is also bypass molded in a basically rectangular box shape, and one is provided for each pocket 16. Each car 18 has a lower side flange 28 and a parallel upper side flange 30, which are connected by a pair of parallel, identical crossbars 32. The side flanges 28 and 30 are of approximately the same axial thickness as the pocket side rails 22 and 24 respectively, and, as indicated by the arrow in FIG. 5, are also diagonally opposed, with no radial overlap. The axial width of each crossbar 32, indicated at C in FIG. 6, is substantially equal to, in fact just slightly less than, the pocket width A. Also, as best seen in FIG. 10, the end to end length L of each roller 20 is just slightly less that C, and therefore substantially equal to A, as well. The opposed inner surfaces of the car crossbars 32 are spaced apart by approximately the diameter of a roller 20, and are also curved slightly so as to conform closely to a roller 20. A clearance notch 34 is "cut" into the lower edge of each side of each car crossbar 32. The dotted line in FIG. 6 indicates exactly where notch 34 is located, and shows that it is axially spaced from the outer surface of car lower side flange 28 by a distance B, which is just slightly less than A. Stated differently, notch 34 is as axially wide as the lower side flange 28. Notch 34 is not actually cut out, of course, but integrally molded, and so requires no additional manufacturing steps or cost. Car 18 may still be bypass molded. Details of the assembly process are described next.

Referring next to FIGS. 8 through 10, the relation of B to C described allows car 18 to be inserted down into pocket 16 along a straight radial line, since it is assured that notch 34 will clear pocket lower side rail 22. Stated differently, since notch 34 is as wide as car lower side flange 28, the car lower side flange 28 can clear the inner surface of pocket upper side rail 24. This is shown occurring in FIG. 8. There is essentially no resistance to car 18 going in, since the side rails 22 and 24 do not have to be forced apart at all. When car 18 has moved radially in as far as it can, as shown in FIG. 9, it may then be axially shifted at right angles to the side, as shown in FIG. 10. The car side flanges 28, 30 and pocket side rails 22, 24 have a complementary configuration. That is, each occupies an exclusive quadrant or subspace within a larger rectangular envelope, with a mutual axial overlap. As a last step, a roller 20 is pushed down between the car crossbars 32. Roller 20 also is moved on a straight line, and does not need a great deal of force to push in place. These straight line, right angle, low force motions may be easily automated than the complex assembly motions described above. Even if assembly is manual, the straight line low force motions are much more efficient.

Referring next to FIGS. 11 and 12, it may be seen how all the components of clutch 10 are cooperatively retained. Roller 20 is prevented from falling out of car 18, because of the fact that the inner surfaces of the car crossbars 32 conform to it, wrapping it slightly above and below its central axis. The car 18-roller 20 subassembly is prevented from falling out of pocket 16 by virtue of the relative dimensions described above. Since L is approximately equal to C, the overlapping relation of pocket side rails 22 and 24 and car side flanges 30 and 28 respectively is maintained. Any axial force attempting to shift car 18 back to the left will bring the left end of roller 20 into contact with the inner surface of pocket lower side rail 22, preventing notch 34 from again clearing lower side rail 22. As shown in FIG. 11, a force acting radially inwardly on a car 18, such as gravity, is resisted by the contact of car upper side flange 30 with pocket lower side rail 22 on the left, and by the contact of the right side edge of the car crossbar 32 with the inner surface of the pocket upper side rails 24 on the right. As seen in FIG. 12, a force pulling radially outwardly on a car 18 is resisted by the contact of car lower side flange 28 with pocket upper side rail 24 on the right, and by the contact of the left end of roller 20 with the inner surface of pocket lower side rail 22 of the left. Thus, roller 20, a basic component of any clutch, serves an additional purpose, filling the gap created by clearance notch 34. A three way cooperation between the basic components of pocket 16, car 18, and roller 20 is made possible, by providing the notch 34, and by carefully controlling the dimensions A, B and C relative to L.

Figure 16:
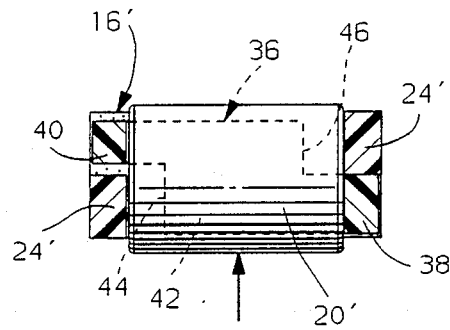
FIG. 16 shows the completed second embodiment, as affected by a force acting radially outwardly.
Figure 17:
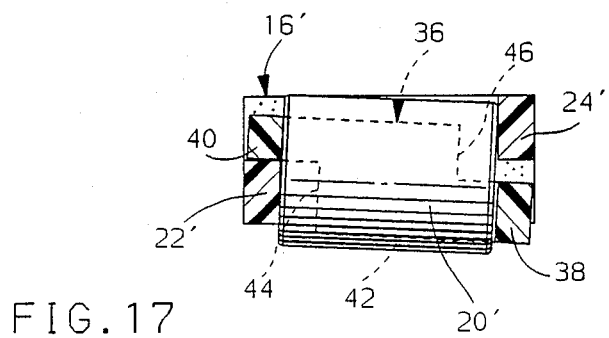
FIG. 17 shows the second embodiment as affected by gravity.

Referring next to FIGS. 13 through 17, a second embodiment of the control car of the invention, indicated generally at 36, is illustrated. Control car 36 incorporates the same basic invention, and so may be briefly described. Car 36 allows for a more flexible assembly technique. The same pocket and same roller are used, which are given the same number with a prime. Car 36 has the same basic shape and size as car 18, with diagonally opposed, lower and upper side flanges 38 and 40, identical to those of the first embodiment. Likewise, the side flanges 38 and 40 are connected by crossbars 42, which are the same basic size as crossbars 32. However, the crossbars 42 each have two clearance notches, lower and upper notches 44 and 46 respectively. Notches 44 and 46 are diagonally opposed, and sized so as to clear the pocket side rails 22' and 24', respectively. Thus, car 36 may be inserted into pocket 16' in either radial direction, inwardly or outwardly. Car 36 is shown being inserted in the radially outward direction, to highlight the additional possibility. As shown in FIG. 16, an attempt to pull car 36 out is resisted in the same way as car 18. However, under the force of gravity, it is the right end of roller 20, that engages the inner surface of the upper pocket side rail 24', not the edge of the crossbar 42, because of the extra notch 46. Since the length of roller 20' is slightly less than C, this means that car 36 will hang down a little more than will car 18. However, the difference is not significant. Car 36 is no more difficult to mold or assemble, and there may be situations where the extra assembly flexibility will be desirable.

Variations of the preferred embodiments may be made. As noted above, since it is necessary only that the pocket 16 have a pair of diagonally opposed surfaces somewhere, the side rails could have some, even total, radial overlap. Or, one side rail could be double and the other single, with no radial overlap. Or, the diagonally opposed surfaces could be provided as surfaces of concave tracks molded into axially opposed side rails. That would be a difficult design to mold, however. Roller 20 need not fit tightly between the car crossbars, only closely, that is, closely enough to be retained against fallout. It would not be necessary that roller 20 pop fit into the car with a great deal of force, just enough to resist the dislodging forces that it would see during shipping. Therefore, it will be understood that it is not intended to limit the invention to just the embodiments disclosed.

The embodiments of the invention in which an exclusive property or privilege is claimed are defined as follows:

1. An overrunning roller clutch, comprising,
    a plurality of generally rectangular roller pockets circumferentially arrayed about a central axis, each roller pocket having a pair of side rails with a pair of diagonally opposed surfaces and a predetermined axial width measured between said side rails,
    a plurality of generally rectangular roller control cars, one for each pocket, each car having a lower side flange and a diagonally opposed upper side flange parallel thereto, said car side flanges and pocket side rail surfaces being disposable in mutually axially overlapping relation,
    each of said cars also having a pair of parallel crossbars, said crossbars having an axial width approximately equal to said pocket width with at least one side of each of said crossbars having a notch large enough to clear one of said pocket side rails, and,
    a plurality of cylindrical rollers, one for each control car, each of said rollers having a diameter sufficient to fit closely between said car crossbars and an end to end length approximately equal to said predetermined pocket width,
    whereby, each car is installed in a respective pocket along a straight line in one radial direction as said notches clear said one pocket side rail and then moved at a right angle axially to the side to bring said pocket side rail surfaces and said car side flanges into axially overlapping relation, after which a roller may be inserted between said car crossbars, thereby maintaining said axially overlapping relation to cooperatively retain said cars and rollers in said pockets.

2. An overrunning roller clutch, comprising,
    a plurality of generally rectangular roller pockets circumferentially arrayed about a central axis, each roller pocket having a lower side rail, a diagonally opposed upper side rail parallel thereto, and a predetermined axial width measured between said side rails,
    a plurality of generally rectangular roller control cars, one for each pocket, each car having a lower side flange and a diagonally opposed upper side flange parallel thereto, said car side flanges and pocket side rails being disposable in mutually axially overlapping relation,
    each of said cars also having a pair of parallel crossbars, said crossbars having an axial width approximately equal to said pocket width with at least one side of each of said crossbars having a notch large enough to clear one of said pocket side rails, and,
    a plurality of cylindrical rollers, one for each control car, each of said rollers having a diameter sufficient to fit closely between said car crossbars and an end to end length approximately equal to said predetermined pocket width,
    whereby, each car is installed in a respective pocket along a straight line in one radial direction as said notches clear said one pocket side rail and then moved at a right angle axially to the side to bring said pocket side rails and car side flanges into axially overlapping relation, after which a roller may be inserted tightly between said car crossbars, thereby maintaining said axially overlapping relation to cooperatively retain said cars and rollers in said pockets.

3. In an overrunning roller clutch of the type having a plurality of generally rectangular roller pockets circumferentially arrayed about a central axis, each roller pocket having a lower side rail, a diagonally opposed upper side rail parallel thereto, and a predetermined axial width measured between said side rails, and also having a plurality of cylindrical rollers, each with an end-to-end length approximately equal to said pocket width, the improvement comprising,
    a plurality of generally rectangular roller control cars, one for each pocket, each car having a lower side flange and a diagonally opposed upper side flange parallel thereto, said car side flanges and pocket side rails being disposable in mutually axially overlapping relation,
    each of said cars also having a pair of parallel crossbars between which a roller may be closely fitted, said car crossbars having an axial width approximately equal to said pocket width with at least one side of each of said crossbars rails having a notch large enough to clear one of said pocket side rails,
    whereby, each car is installed in a respective pocket along a straight line in one radial direction as said notches clear said one pocket side rail and then moved at a right angle axially to the side to bring said pocket side rails and car side flanges into axially overlapping relation, after which a roller may be inserted tightly between said car crossbars, thereby maintaining said axially overlapping relation to cooperatively retain said cars and rollers in said pockets.

* * * * *